(12) United States Patent
Zou et al.

(10) Patent No.: US 11,909,513 B2
(45) Date of Patent: Feb. 20, 2024

(54) SPECTRUM PROCESSING APPARATUS AND RECONFIGURABLE OPTICAL ADD-DROP MULTIPLEXER

(71) Applicant: Huawei Technologies Co., Ltd., Shenzhen (CN)

(72) Inventors: Bing Zou, Shenzhen (CN); Yunfei Yan, Dongguan (CN); Shimao Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/695,545

(22) Filed: Mar. 15, 2022

(65) Prior Publication Data

US 2022/0239401 A1 Jul. 28, 2022

Related U.S. Application Data

(63) Continuation of application No. PCT/CN2020/100312, filed on Jul. 5, 2020.

(30) Foreign Application Priority Data

Sep. 17, 2019 (CN) .......................... 201910877927.6

(51) Int. Cl.
  *H04J 14/02* (2006.01)
  *G02B 15/14* (2006.01)
  *G02B 27/09* (2006.01)

(52) U.S. Cl.
  CPC ............ *H04J 14/021* (2013.01); *G02B 15/14* (2013.01); *G02B 27/0955* (2013.01)

(58) Field of Classification Search
  CPC ... H04J 14/021; G02B 15/14; G02B 27/0955; G02B 6/2706; G02B 6/29313;
  (Continued)

(56) References Cited

U.S. PATENT DOCUMENTS

| | | |
|---|---|---|
| 6,504,970 B2 | 1/2003 | Doerr |
| 6,782,205 B2 | 8/2004 | Trisnadi et al. |

(Continued)

FOREIGN PATENT DOCUMENTS

| | | |
|---|---|---|
| CN | 102498427 A | 6/2012 |
| CN | 102868476 A | 1/2013 |

(Continued)

*Primary Examiner* — Leslie C Pascal
(74) *Attorney, Agent, or Firm* — Slater Matsil, LLP

(57) ABSTRACT

Embodiments of this application disclose a spectrum processing apparatus, which includes: a port assembly, a lens assembly, a dispersive assembly, a spatial light modulator (SLM), and a reflective element. Each port in the port assembly is configured to transmit an input first light beam to a lens corresponding to the port. Each lens in the lens assembly is configured to adjust a width of the first light beam to obtain a second light beam. The reflective element is configured to reflect the second light beam to the dispersive assembly. The dispersive assembly is configured to decompose the second light beam into a plurality of sub-wavelength light beams. The reflective element is further configured to reflect the plurality of sub-wavelength light beams to the SLM. The SLM is configured to modulate the plurality of sub-wavelength light beams, and reflect at least one modulated sub-wavelength light beam to the reflective element.

20 Claims, 9 Drawing Sheets

(58) Field of Classification Search
CPC ............ G02B 6/29382; G02B 6/29305; G02B 6/29395; G02B 6/2938; G02B 27/0977; G02B 27/28
See application file for complete search history.

(56) References Cited

U.S. PATENT DOCUMENTS

| | | |
|---|---|---|
| 6,898,348 B2 | 5/2005 | Morozov et al. |
| 7,014,326 B2 | 3/2006 | Danagher et al. |
| RE39,397 E | 11/2006 | Wilde et al. |
| 7,133,202 B1 | 11/2006 | Gu et al. |
| 2003/0068130 A1 | 4/2003 | Gao |
| 2004/0047632 A1 | 3/2004 | Powell |
| 2006/0067611 A1 | 3/2006 | Frisken et al. |
| 2010/0021103 A1 | 1/2010 | Mino et al. |
| 2010/0284648 A1 | 11/2010 | Furukawa et al. |
| 2017/0190331 A1 | 7/2017 | Gupta et al. |
| 2019/0172162 A1 | 6/2019 | Smith, Sr. |
| 2019/0372674 A1* | 12/2019 | Smith ............... H04J 14/0212 |
| 2020/0264379 A1* | 8/2020 | Frisken ............... G02B 6/3588 |

FOREIGN PATENT DOCUMENTS

| | | | |
|---|---|---|---|
| CN | 103353633 A | 10/2013 | |
| CN | 105229512 A | 1/2016 | |
| CN | 106416097 A | 2/2017 | |
| CN | 106772813 A | 5/2017 | |
| CN | 107328475 A | 11/2017 | |
| CN | 108459375 A | 8/2018 | |
| WO | WO-2014015129 A1 * | 1/2014 | ........... G02B 6/3512 |
| WO | 2017190331 A1 | 11/2017 | |
| WO | 2019172162 A1 | 9/2019 | |

\* cited by examiner ial Application
SPECTRUM PROCESSING APPARATUS AND RECONFIGURABLE OPTICAL ADD-DROP MULTIPLEXER

CROSS-REFERENCE TO RELATED APPLICATIONS

This application is a continuation of International Application No. PCT/CN2020/100312, filed on Jul. 5, 2020, which claims priority to Chinese Patent Application No. 201910877927.6 filed on Sep. 17, 2019. The disclosures of the aforementioned applications are hereby incorporated by reference in their entireties.

TECHNICAL FIELD

This application relates to the field of optical communications, and in particular, to a spectrum processing apparatus and a reconfigurable optical add-drop multiplexer.

BACKGROUND

In recent years, with the vigorous development of network data services, capacities of optical transmission systems have become increasingly large, and requirements for optical networks have also become increasingly high. High-performance and flexibly configurable optical networks are the development direction of future optical networks, and the use of apparatuses having a spectrum processing capability is required in many cases.

These spectrum processing apparatuses having a spectrum processing capability can flexibly change spectral characteristics or can be used to detect a spectrum based on requirements of optical networks. The spectrum processing apparatuses are important components for high-performance intelligent optical networks. A spectrum processing apparatus used for wavelength blocking is used as an example. A dispersive assembly separates wavelengths of an incident light beam, and light beams with different wavelengths are incident onto different positions of a spatial light modulator (SLM). The SLM determines wavelengths of light beams that can be reflected to an output port and wavelengths to be blocked.

The spectrum processing apparatus used for wavelength blocking requires bandwidth in each wavelength channel to be as large as possible, and then a light spot formed on the SLM needs to be as small as possible. However, if the spectrum processing apparatus is used for overall spectrum adjustment, small light spots on the SLM may produce glitches in the spectrum, which makes it difficult to form a smooth spectrum. In other words, the spectrum processing apparatus used for wavelength blocking is not suitable for overall spectrum adjustment. Therefore, a current spectrum processing apparatus has a limited function.

SUMMARY

Embodiments of this application provide a spectrum processing apparatus and a reconfigurable optical add-drop multiplexer, thereby enriching functions of the spectrum processing apparatus.

According to a first aspect, an embodiment of this application provides a spectrum processing apparatus, including: a port assembly, a lens assembly, a dispersive assembly, a spatial light modulator SLM, and a reflective element, where the port assembly includes N ports, and the lens assembly includes M lenses, where N is an integer greater than 1, and M is an integer greater than or equal to 1 and less than or equal to N. Each port in the port assembly is configured to transmit an input first light beam to a lens corresponding to the port. Each lens in the lens assembly is configured to adjust a width of the first light beam to obtain a second light beam, and transmit the second light beam to the reflective element. The reflective element is configured to reflect the second light beam to the dispersive assembly. The dispersive assembly is configured to decompose the second light beam into a plurality of sub-wavelength light beams, and transmit the plurality of sub-wavelength light beams to the reflective element. The reflective element is further configured to reflect the plurality of sub-wavelength light beams to the SLM. The SLM is configured to modulate the plurality of sub-wavelength light beams, and reflect at least one modulated sub-wavelength light beam to the reflective element. The reflective element is further configured to reflect the at least one sub-wavelength light beam to the dispersive assembly. The dispersive assembly is further configured to multiplex the at least one sub-wavelength light beam, and transmit a multiplexed light beam successively through the reflective element and the lens assembly to the port assembly.

It should be understood that the SLM may be a liquid crystal modulator, a liquid crystal on silicon (LCoS) array, a microelectromechanical system (MEMS) micromirror array, or the like. The SLM changes a reflection direction of the sub-wavelength light beam such that the sub-wavelength light beam can be completely reflected to a port without any loss, or the sub-wavelength light beam cannot be reflected to the port, or a part of the sub-wavelength light beam can be reflected to the port.

In this implementation, due to different sizes of light spots on the SLM, corresponding light beams are applicable to different functions. For example, a light beam corresponding to a small light spot is applicable to a wavelength blocking function, while a light beam corresponding to a large light spot is applicable to overall spectrum adjustment. In the spectrum processing apparatus provided in this application, the port assembly includes at least two ports, and each lens in the lens assembly can adjust a width of a light beam from a port. To be specific, a width of a light beam after passing through a lens may become larger or smaller, or may remain unchanged, and sizes of light spots formed by light beams of different widths on the SLM are also different. Therefore, the plurality of ports of the spectrum processing apparatus may be used to implement different functions, thereby enriching functions of the spectrum processing apparatus.

Optionally, in some possible implementations, the M lenses are all zoom lenses, for example, variable-focus liquid lenses. A focal length of each lens may be adjusted at any time, and a width of a first light beam passing through a same lens may also be adjusted at any time, so that each port can adapt to a plurality of functions.

Optionally, in some possible implementations, each port includes an input port and an output port; and each port in the port assembly being configured to transmit an input first light beam to a lens corresponding to the port includes: each input port being configured to transmit the input first light beam to a lens corresponding to the input port; and the dispersive assembly being further configured to multiplex the at least one sub-wavelength light beam, and transmit a multiplexed light beam successively through the reflective element and the lens assembly to the port assembly includes: the dispersive assembly being further configured to multiplex the at least one sub-wavelength light beam, and transmit the multiplexed light beam successively through the reflective element and the lens assembly to the output port corresponding to the input port.

In this implementation, each port may include an input port and an output port, and then an input light beam and an output light beam are separated on a transmission path, thereby improving applicability of this solution.

Optionally, in some possible implementations, the spectrum processing apparatus further includes a polarization assembly, and the polarization assembly is located between the lens assembly and the reflective element; and the polarization assembly is configured to separate polarizations of the second light beam into a first polarized light beam and a second polarized light beam, and transmit the first polarized light beam and the second polarized light beam to the dispersive assembly, where the first polarized light beam and the second polarized light beam have mutually orthogonal polarization components.

In this implementation, the spectrum processing apparatus may further be provided with the polarization assembly, thereby improving scalability of this solution.

Optionally, in some possible implementations, the N ports are symmetrically distributed with respect to an optic axis of the reflective element.

In this implementation, applicable functions of the spectrum processing apparatus not only have different requirements for sizes of light spots formed on the SLM, but also have different requirements for insertion loss (IL) of each port. In optical design, a shorter distance between a port and the optic axis of the reflective element indicates smaller insertion loss of the port. Therefore, in design of distribution of ports, the ports may be symmetrically distributed with respect to the optic axis of the reflective element, so as to differentiate insertion loss of the ports during use, and select corresponding ports to implement different functions.

According to a second aspect, an embodiment of this application provides another spectrum processing apparatus, including: a port assembly, a lens assembly, a dispersive assembly, a spatial light modulator SLM, and a first lens, where the port assembly includes N ports, and the lens assembly includes M lenses, where N is an integer greater than 1, and M is an integer greater than or equal to 1 and less than or equal to N. Each port in the port assembly is configured to transmit an input first light beam to a lens corresponding to the port. Each lens in the lens assembly is configured to adjust a width of the first light beam to obtain a second light beam, and transmit the second light beam to the dispersive assembly. The dispersive assembly is configured to decompose the second light beam into a plurality of sub-wavelength light beams in a first plane, and transmit the plurality of sub-wavelength light beams to the first lens. The first lens is configured to refract the plurality of sub-wavelength light beams to the SLM in the first plane, and transmit the plurality of sub-wavelength light beams to the SLM in a second plane, where the second plane is perpendicular to the first plane. The SLM is configured to modulate the plurality of sub-wavelength light beams, and reflect at least one modulated sub-wavelength light beam to the first lens. The first lens is further configured to refract the at least one sub-wavelength light beam to the dispersive assembly in the first plane, and transmit the at least one sub-wavelength light beam to the dispersive assembly in the second plane. The dispersive assembly is further configured to multiplex the at least one sub-wavelength light beam, and transmit a multiplexed light beam through the lens assembly to the port assembly.

Optionally, in some possible implementations, the M lenses are all zoom lenses.

Optionally, in some possible implementations, each port includes an input port and an output port; and each port in the port assembly being configured to transmit an input first light beam to a lens corresponding to the port includes: each input port being configured to transmit the input first light beam to a lens corresponding to the input port; and the dispersive assembly being further configured to multiplex the at least one sub-wavelength light beam, and transmit a multiplexed light beam through the lens assembly to the port assembly includes: the dispersive assembly being further configured to multiplex the at least one sub-wavelength light beam, and transmit the multiplexed light beam through the lens assembly to the output port corresponding to the input port.

Optionally, in some possible implementations, the spectrum processing apparatus further includes a polarization assembly, and the polarization assembly is located between the lens assembly and the dispersive assembly; and the polarization assembly is configured to separate polarizations of the second light beam into a first polarized light beam and a second polarized light beam, and transmit the first polarized light beam and the second polarized light beam to the dispersive assembly, where the first polarized light beam and the second polarized light beam have mutually orthogonal polarization components.

Optionally, in some possible implementations, the N ports are symmetrically distributed with respect to an optic axis of the first lens.

According to a third aspect, an embodiment of this application provides another spectrum processing apparatus, including: a port assembly, a lens assembly, a dispersive assembly, a spatial light modulator SLM, a first lens, and a second lens, where the port assembly includes N ports, and the lens assembly includes M lenses, where N is an integer greater than 1, and M is an integer greater than or equal to 1 and less than or equal to N. Each port in the port assembly is configured to transmit an input first light beam to a lens corresponding to the port. Each lens in the lens assembly is configured to adjust a width of the first light beam to obtain a second light beam, and transmit the second light beam to the second lens. The second lens is configured to refract the second light beam to the dispersive assembly in a second plane. The dispersive assembly is configured to decompose the second light beam into a plurality of sub-wavelength light beams in a first plane, and transmit the plurality of sub-wavelength light beams to the first lens, where the first plane is perpendicular to the second plane. The first lens is configured to refract the plurality of sub-wavelength light beams to the SLM in the first plane and the second plane. The SLM is configured to modulate the plurality of sub-wavelength light beams, and reflect at least one modulated sub-wavelength light beam to the first lens. The first lens is further configured to refract the at least one sub-wavelength light beam to the dispersive assembly in the first plane and the second plane. The dispersive assembly is further configured to multiplex the at least one sub-wavelength light beam, and transmit a multiplexed light beam successively through the second lens and the lens assembly to the port assembly.

Optionally, in some possible implementations, the second lens is located between the dispersive assembly and the lens assembly, the first lens is located between the dispersive assembly and the SLM, a distance between the first lens and the dispersive assembly is equal to a focal length of the first lens, a distance between the second lens and the dispersive assembly is equal to a focal length of the second lens, and a distance between the first lens and the SLM is equal to the focal length of the first lens.

In this implementation, the first lens and the second lens use a standard 4f optical lens configuration, and a transmission path of a light beam is more regular, thereby improving implementability of this solution.

Optionally, in some possible implementations, the M lenses are all zoom lenses.

Optionally, in some possible implementations, each port includes an input port and an output port; and each port in the port assembly being configured to transmit an input first light beam to a lens corresponding to the port includes: each input port being configured to transmit the input first light beam to a lens corresponding to the input port; and the dispersive assembly being further configured to multiplex the at least one sub-wavelength light beam, and transmit a multiplexed light beam successively through the second lens and the lens assembly to the port assembly includes: the dispersive assembly being further configured to multiplex the at least one sub-wavelength light beam, and transmit the multiplexed light beam successively through the second lens and the lens assembly to the output port corresponding to the input port.

Optionally, in some possible implementations, the spectrum processing apparatus further includes a polarization assembly, and the polarization assembly is located between the lens assembly and the second lens; and the polarization assembly is configured to separate polarizations of the second light beam into a first polarized light beam and a second polarized light beam, and transmit the first polarized light beam and the second polarized light beam to the first lens, where the first polarized light beam and the second polarized light beam have mutually orthogonal polarization components.

Optionally, in some possible implementations, the N ports are symmetrically distributed with respect to an optic axis of the first lens or the second lens.

According to a fourth aspect, an embodiment of this application provides a reconfigurable optical add-drop multiplexer (ROADM), including: an add module, a drop module, and the spectrum processing apparatus according to any one of the first aspect to the third aspect. The spectrum processing apparatus is configured to implement a spectrum processing function. The add module is configured to add a local optical wavelength signal from the port assembly of the spectrum processing apparatus. The drop module is configured to drop a local optical wavelength signal from the port assembly of the spectrum processing apparatus.

According to a fifth aspect, an embodiment of this application provides a spectrum processing method, applied to a spectrum processing apparatus, where the spectrum processing apparatus includes: a port assembly, a lens assembly, a dispersive assembly, a spatial light modulator SLM, and a reflective element, where the port assembly includes N ports, and the lens assembly includes M lenses, where N is an integer greater than 1, and M is an integer greater than or equal to 1 and less than or equal to N.

The method includes: transmitting, by each port in the port assembly, an input first light beam to a lens corresponding to each port; adjusting, by each lens in the lens assembly, a width of the first light beam to obtain a second light beam, and transmitting the second light beam to the reflective element; reflecting, by the reflective element, the second light beam to the dispersive assembly; decomposing, by the dispersive assembly, the second light beam into a plurality of sub-wavelength light beams, and transmitting the plurality of sub-wavelength light beams to the reflective element; reflecting, by the reflective element, the plurality of sub-wavelength light beams to the SLM; modulating, by the SLM, the plurality of sub-wavelength light beams, and reflecting at least one modulated sub-wavelength light beam to the reflective element; reflecting, by the reflective element, the at least one sub-wavelength light beam to the dispersive assembly; and multiplexing, by the dispersive assembly, the at least one sub-wavelength light beam, and transmitting a multiplexed light beam successively through the reflective element and the lens assembly to the port assembly.

Optionally, in some possible implementations, the M lenses are all zoom lenses.

Optionally, in some possible implementations, each port includes an input port and an output port; and the transmitting, by each port in the port assembly, an input first light beam to a lens corresponding to each port includes: transmitting, by each input port, the input first light beam to a lens corresponding to the input port; and the multiplexing, by the dispersive assembly, the at least one sub-wavelength light beam, and transmitting a multiplexed light beam successively through the reflective element and the lens assembly to the port assembly includes: multiplexing, by the dispersive assembly, the at least one sub-wavelength light beam, and transmitting the multiplexed light beam successively through the reflective element and the lens assembly to the output port corresponding to the input port.

Optionally, in some possible implementations, the spectrum processing apparatus further includes a polarization assembly, and the polarization assembly is located between the lens assembly and the reflective element; and the method further includes: separating, by the polarization assembly, polarizations of the second light beam into a first polarized light beam and a second polarized light beam, and transmitting the first polarized light beam and the second polarized light beam to the dispersive assembly, where the first polarized light beam and the second polarized light beam have mutually orthogonal polarization components.

Optionally, in some possible implementations, the N ports are symmetrically distributed with respect to an optic axis of the reflective element.

According to a sixth aspect, an embodiment of this application provides another spectrum processing method, applied to a spectrum processing apparatus, where the spectrum processing apparatus includes: a port assembly, a lens assembly, a dispersive assembly, a spatial light modulator SLM, and a first lens, where the port assembly includes N ports, and the lens assembly includes M lenses, where N is an integer greater than 1, and M is an integer greater than or equal to 1 and less than or equal to N.

The method includes: transmitting, by each port in the port assembly, an input first light beam to a lens corresponding to each port; adjusting, by each lens in the lens assembly, a width of the first light beam to obtain a second light beam, and transmitting the second light beam to the dispersive assembly; decomposing, by the dispersive assembly, the second light beam into a plurality of sub-wavelength light beams in a first plane, and transmitting the plurality of sub-wavelength light beams to the first lens; refracting, by the first lens, the plurality of sub-wavelength light beams to the SLM in the first plane, and transmitting the plurality of sub-wavelength light beams to the SLM in a second plane, where the second plane is perpendicular to the first plane; modulating, by the SLM, the plurality of sub-wavelength light beams, and reflecting at least one modulated sub-wavelength light beam to the first lens; refracting, by the first lens, the at least one sub-wavelength light beam to the dispersive assembly in the first plane, and transmitting the at least one sub-wavelength light beam to the dispersive assembly in the second plane; and multiplexing, by the dispersive assembly, the at least one sub-wavelength light beam, and transmitting a multiplexed light beam through the lens assembly to the port assembly.

Optionally, in some possible implementations, the M lenses are all zoom lenses.

Optionally, in some possible implementations, each port includes an input port and an output port; and the transmitting, by each port in the port assembly, an input first light beam to a lens corresponding to each port includes: transmitting, by each input port, the input first light beam to a lens corresponding to the input port; and the multiplexing, by the dispersive assembly, the at least one sub-wavelength light beam, and transmitting a multiplexed light beam through the lens assembly to the port assembly includes: multiplexing, by the dispersive assembly, the at least one sub-wavelength light beam, and transmitting the multiplexed light beam through the lens assembly to the output port corresponding to the input port.

Optionally, in some possible implementations, the spectrum processing apparatus further includes a polarization assembly, and the polarization assembly is located between the lens assembly and the dispersive assembly; and the method further includes: separating, by the polarization assembly, polarizations of the second light beam into a first polarized light beam and a second polarized light beam, and transmitting the first polarized light beam and the second polarized light beam to the dispersive assembly, where the first polarized light beam and the second polarized light beam have mutually orthogonal polarization components.

Optionally, in some possible implementations, the N ports are symmetrically distributed with respect to an optic axis of the first lens.

According to a seventh aspect, an embodiment of this application provides another spectrum processing method, applied to a spectrum processing apparatus, where the spectrum processing apparatus includes: a port assembly, a lens assembly, a dispersive assembly, a spatial light modulator SLM, a first lens, and a second lens, where the port assembly includes N ports, and the lens assembly includes M lenses, where N is an integer greater than 1, and M is an integer greater than or equal to 1 and less than or equal to N.

The method includes: transmitting, by each port in the port assembly, an input first light beam to a lens corresponding to each port; adjusting, by each lens in the lens assembly, a width of the first light beam to obtain a second light beam, and transmitting the second light beam to the second lens; refracting, by the second lens, the second light beam to the dispersive assembly in a second plane; decomposing, by the dispersive assembly, the second light beam into a plurality of sub-wavelength light beams in a first plane, and transmitting the plurality of sub-wavelength light beams to the first lens, where the first plane is perpendicular to the second plane; refracting, by the first lens, the plurality of sub-wavelength light beams to the SLM in the first plane and the second plane; modulating, by the SLM, the plurality of sub-wavelength light beams, and reflecting at least one modulated sub-wavelength light beam to the first lens; refracting, by the first lens, the at least one sub-wavelength light beam to the dispersive assembly in the first plane and the second plane; and multiplexing, by the dispersive assembly, the at least one sub-wavelength light beam, and transmitting a multiplexed light beam successively through the second lens and the lens assembly to the port assembly.

Optionally, in some possible implementations, the second lens is located between the dispersive assembly and the lens assembly, the first lens is located between the dispersive assembly and the SLM, a distance between the first lens and the dispersive assembly is equal to a focal length of the first lens, a distance between the second lens and the dispersive assembly is equal to a focal length of the second lens, and a distance between the first lens and the SLM is equal to the focal length of the first lens.

Optionally, in some possible implementations, the M lenses are all zoom lenses.

Optionally, in some possible implementations, each port includes an input port and an output port; and the transmitting, by each port in the port assembly, an input first light beam to a lens corresponding to each port includes: transmitting, by each input port, the input first light beam to a lens corresponding to the input port; and the multiplexing, by the dispersive assembly, the at least one sub-wavelength light beam, and transmitting a multiplexed light beam successively through the second lens and the lens assembly to the port assembly includes: multiplexing, by the dispersive assembly, the at least one sub-wavelength light beam, and transmitting the multiplexed light beam successively through the second lens and the lens assembly to the output port corresponding to the input port.

Optionally, in some possible implementations, the spectrum processing apparatus further includes a polarization assembly, and the polarization assembly is located between the lens assembly and the second lens; and the method further includes: separating, by the polarization assembly, polarizations of the second light beam into a first polarized light beam and a second polarized light beam, and transmitting the first polarized light beam and the second polarized light beam to the first lens, where the first polarized light beam and the second polarized light beam have mutually orthogonal polarization components.

Optionally, in some possible implementations, the N ports are symmetrically distributed with respect to an optic axis of the first lens or the second lens.

It can be learned from the foregoing technical solutions that the embodiments of this application have the following advantages:

In the embodiments of this application, due to different sizes of light spots on the SLM, corresponding light beams are applicable to different functions. For example, a light beam corresponding to a small light spot is applicable to a wavelength blocking function, while a light beam corresponding to a large light spot is applicable to overall spectrum adjustment. In the spectrum processing apparatus provided in this application, the port assembly includes at least two ports, and each lens in the lens assembly can adjust a width of a light beam from a port. To be specific, a width of a light beam after passing through a lens may become larger or smaller, or may remain unchanged, and sizes of light spots formed by light beams of different widths on the SLM are also different. Therefore, the plurality of ports of the spectrum processing apparatus may be used to implement different functions, thereby enriching functions of the spectrum processing apparatus.

DETAILED DESCRIPTION OF ILLUSTRATIVE EMBODIMENTS

Embodiments of this application provide a spectrum processing apparatus and a reconfigurable optical add-drop multiplexer, thereby enriching functions of the spectrum processing apparatus. In the specification, claims, and accompanying drawings of this application, the terms "first", "second", "third", "fourth", and the like (if existent) are intended to distinguish between similar objects but do not necessarily indicate a specific order or sequence. It should be understood that data termed in such a way are interchangeable in proper circumstances so that the embodiments described herein can be implemented in other orders than the order illustrated or described herein. Moreover, the terms "include", "have" and any other variants thereof mean to cover the non-exclusive inclusion, for example, a process, method, system, product, or device that includes a list of steps or units is not necessarily limited to the clearly listed steps or units, but may include other steps or units not clearly listed or inherent to such a process, method, product, or device.

Figure 1:
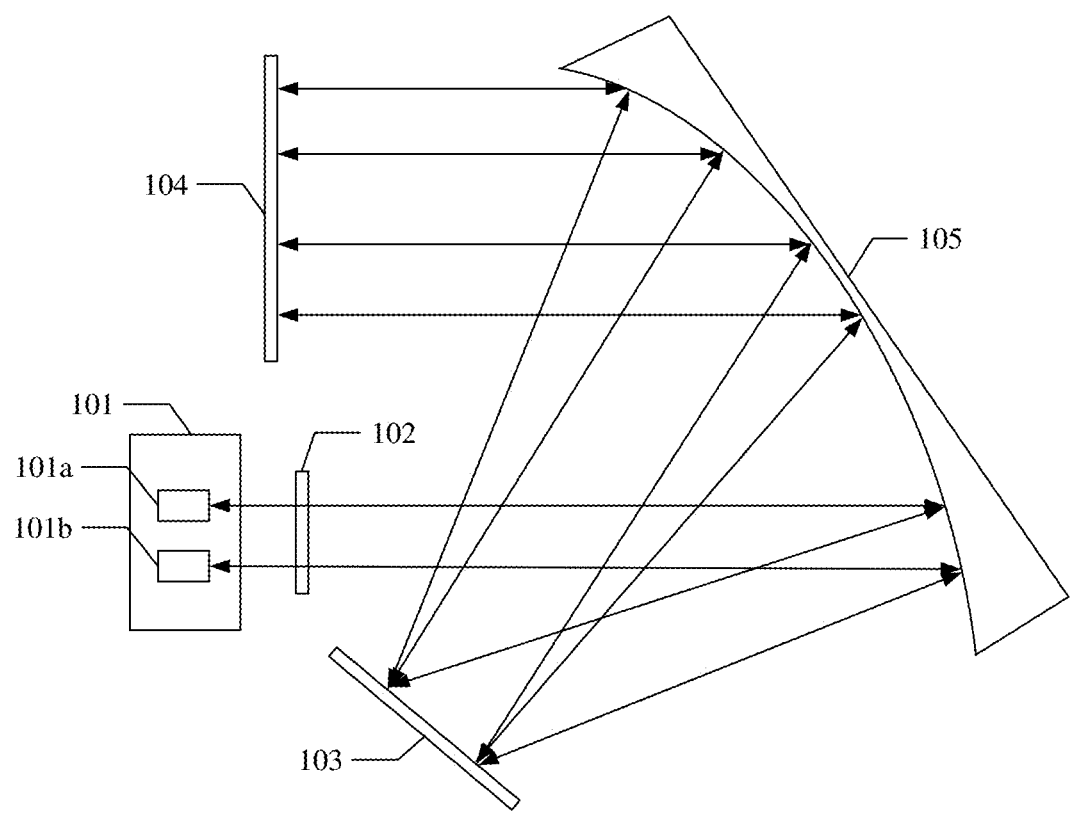
FIG. 1 is a top view of a structure of a first spectrum processing apparatus according to an embodiment of this application.

FIG. 1 is a top view of a structure of a first spectrum processing apparatus according to an embodiment of this application. The spectrum processing apparatus includes: a port assembly 101, a lens assembly 102, a dispersive assembly 103, a spatial light modulator (SLM) 104, and a reflective element 105. The port assembly 101 includes N ports, where N is an integer greater than 1. The lens assembly 102 consists of M lenses, where M is an integer greater than or equal to 1 and less than or equal to N. Therefore, not all ports have their respective lenses.

Each port in the port assembly 101 is configured to transmit an input first light beam to a lens corresponding to the port. Each lens in the lens assembly 102 is configured to adjust a width of the first light beam to obtain a second light beam, and transmit the second light beam to the reflective element 105. The reflective element 105 is configured to reflect the second light beam to the dispersive assembly 103. The dispersive assembly 103 is configured to decompose the second light beam into a plurality of sub-wavelength light beams, and transmit the plurality of sub-wavelength light beams to the reflective element 105. The reflective element 105 is further configured to reflect the plurality of sub-wavelength light beams to the spatial light modulator 104. The spatial light modulator 104 is configured to modulate the plurality of sub-wavelength light beams, and reflect at least one modulated sub-wavelength light beam to the reflective element 105. The reflective element 105 is further configured to reflect the at least one sub-wavelength light beam to the dispersive assembly 103. The dispersive assembly 103 is further configured to multiplex the at least one sub-wavelength light beam, and transmit a multiplexed light beam successively through the reflective element 105 and the lens assembly 102 to the port assembly 101.

It should be noted that the ports in the port assembly 101 may have a plurality of arrangements. For example, the ports may be sequentially arranged in the plane shown in FIG. 1; or the ports may be sequentially arranged in a plane perpendicular to the plane shown in FIG. 1; or the ports are distributed in both planes, that is, the port assembly 101 may also be an array with ports arranged in both rows and columns. This is not specifically limited herein. For example, when seen from the perspective shown in FIG. 1, the port assembly 101 may include a first column in which a first port 101a is located and a second column in which a second port 101b is located. In the first column, a plurality of other ports may be sequentially arranged following the first port 101a. Similarly, in the second column, a plurality of other ports may be sequentially arranged following the second port 101b.

Figure 2:
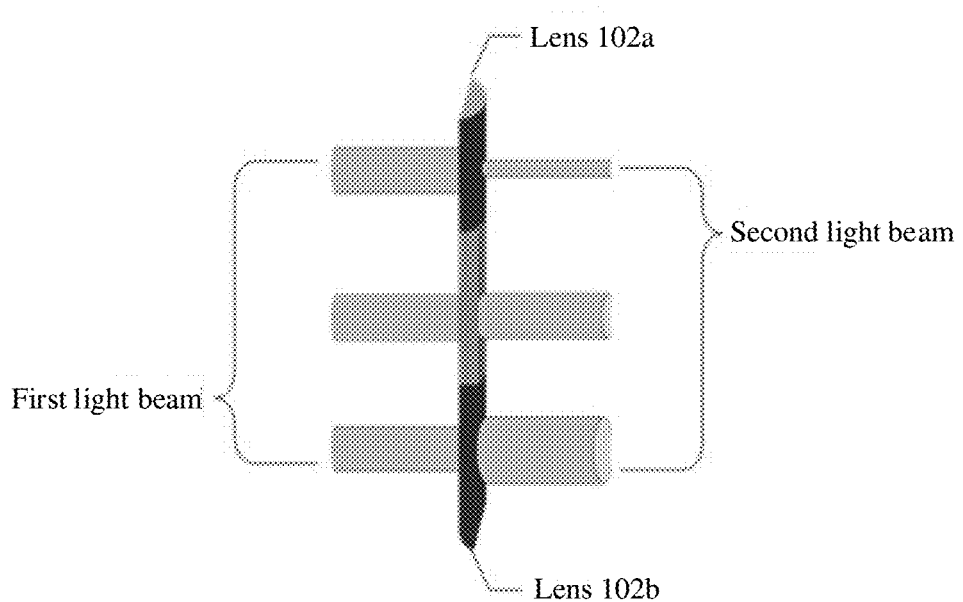
FIG. 2 is a schematic diagram of a structure of a lens assembly.

FIG. 2 is a schematic diagram of a structure of a lens assembly. It may be understood that different lenses (including convex lenses, concave lenses, and the like) may converge or diverge light beams, and therefore may cause changes in a size of a light spot formed by a light beam striking the spatial light modulator 104. For example, the lens assembly 102 in FIG. 2 includes an A lens 102a and a B lens 102b, where the A lens 102a is a convex lens, and after a first light beam passes through the A lens 102a, a width of the light beam decreases; and the B lens 102b, is a concave lens, and after a first light beam passes through the B lens 102b, a width of the light beam increases.

It should be noted that, if a width of a first light beam emitted from some port meets requirements, no lens may be arranged on a transmission path of the first light beam to change the width of the light beam, or a plane mirror may be placed at a corresponding position of the lens assembly 102 only to transmit the first light beam. In practical applications, the lens assembly 102 may be a combination of M separate lenses. Certainly, another design may also be possible. For example, the lens assembly 102 may alternatively be an integral light transmitting surface structure, and different positions of the integral light transmitting surface structure are formed with different curvatures, to adjust the width of the first light beam. A structure of the lens assembly 102 is not specifically limited herein.

Figure 3:
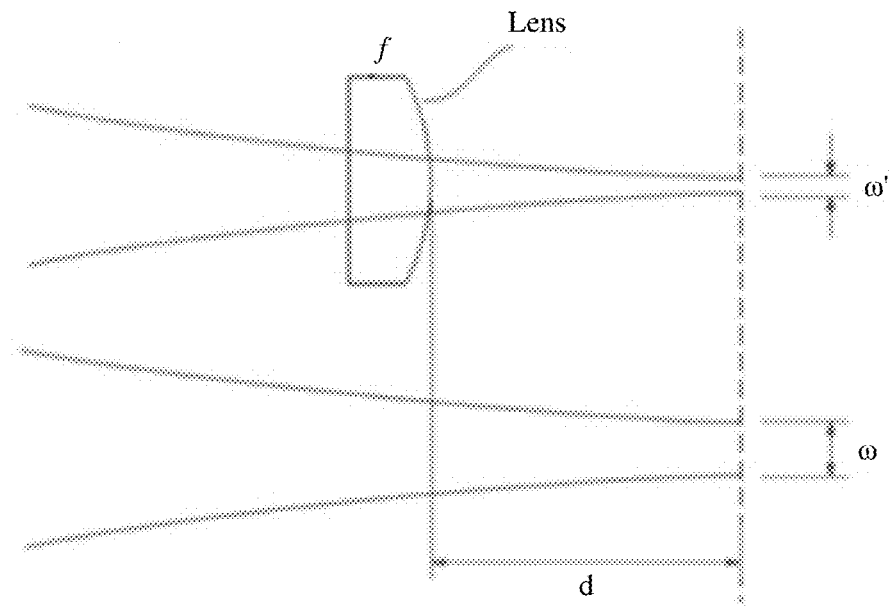
FIG. 3 is a schematic diagram of changes in a beam waist radius after a light beam passes through a lens.

It should be noted that a focal length of a lens meeting requirements may be pre-calculated based on an actual required width of a light beam. A possible implementation is provided below, where a width of a light beam is represented by a beam waist radius. FIG. 3 is a schematic diagram of changes in a beam waist radius after a light beam passes through a lens. If a first light beam does not pass through a lens or a curvature of the lens is infinite, a beam waist radius of a second light beam is ω. If the first light beam passes through a lens with a focal length f, the beam waist radius of the second light beam is ω'. According to Gaussian optics, the focal length f of the lens may be selected according to the following formula:

$$\frac{\omega'}{\omega} = \frac{1}{\sqrt{1-\left(\frac{d}{f}\right)^2 + \left(\frac{z_R}{f}\right)^2}},$$

where ω is a beam waist radius of the first light beam, ω' is a beam waist radius of the second light beam, f is the focal length of the lens, d is a distance between a beam waist position of the second light beam and the lens, $z_R$ is a Rayleigh distance of the first light beam, $z_R=\pi\omega^2/\lambda$, and λ is a wavelength of the first light beam.

Optionally, the lenses in the lens assembly 102 may be zoom lenses, for example, variable-focus liquid lenses. A focal length of each lens may be adjusted at any time, and a width of a first light beam passing through a same lens may also be adjusted at any time, so that each port can adapt to a plurality of functions.

It should be noted that, the dispersive assembly 103 may usually be a structure such as a grating or a prism, and can decompose the second light beam into a plurality of sub-wavelength light beams by wavelength, where each sub-wavelength light beam has a different wavelength. It may be understood that each sub-wavelength light beam is transmitted to a different position of the spatial light modulator 104. For example, after passing through the dispersive assembly 103, each second light beam is decomposed into two sub-wavelength light beams. Specifically, a quantity of sub-wavelength light beams decomposed from the second light beam after the second light beam passes through the dispersive assembly 103 is subject to practical applications. This is not limited herein.

Optionally, the spatial light modulator 104 may be specifically a plurality of different structures, for example, a liquid crystal modulator, a liquid crystal on silicon (LCoS) array, and a microelectromechanical system (MEMS) micromirror array. This is not specifically limited herein.

For example, the spatial light modulator 104 is specifically an LCoS. The LCoS has a pixelated region for modulation, and a reflection direction of each sub-wavelength light beam can be changed by modulating pixels of a corresponding wavelength region. For example, the spatial light modulator 104 is specifically a MEMS micromirror array. The MEMS micromirror array consists of a plurality of rotatable reflectors, and a reflection direction of a sub-wavelength light beam is adjusted by rotating the reflectors. Specifically, after a sub-wavelength light beam is incident onto the spatial light modulator 104, the spatial light modulator 104 changes a reflection direction of the sub-wavelength light beam such that the sub-wavelength light beam can be completely reflected to a port without any loss, or the sub-wavelength light beam cannot be reflected to the port, or a part of the sub-wavelength light beam can be reflected to the port. A specific modulation scheme of the spatial light modulator 104 is subject to practical applications, and this is not limited herein.

Optionally, each port in the port assembly 101 may be classified as an input port and an output port. It may be understood that each input port is configured to transmit the input first light beam to a lens corresponding to the input port, and after the dispersive assembly 103 multiplexes the sub-wavelength light beam reflected by the spatial light modulator 104, a multiplexed light beam is transmitted successively through the reflective element 105 and the lens assembly 102 to the output port.

In this embodiment of this application, due to different sizes of light spots on the SLM, corresponding light beams are applicable to different functions. For example, a light beam corresponding to a small light spot is applicable to a wavelength blocking function, while a light beam corresponding to a large light spot is applicable to overall spectrum adjustment. In the spectrum processing apparatus provided in this application, the port assembly includes at least two ports, and each lens in the lens assembly can adjust a width of a light beam from a port. To be specific, a width of a light beam after passing through a lens may become larger or smaller, or may remain unchanged, and sizes of light spots formed by light beams of different widths on the SLM are also different. Therefore, the plurality of ports of the spectrum processing apparatus may be used to implement different functions, thereby enriching functions of the spectrum processing apparatus.

FIG. 1 elaborates on the structure of the first spectrum processing apparatus in this application. The following describes other possible structures of the spectrum processing apparatus in this application.

Figure 4:
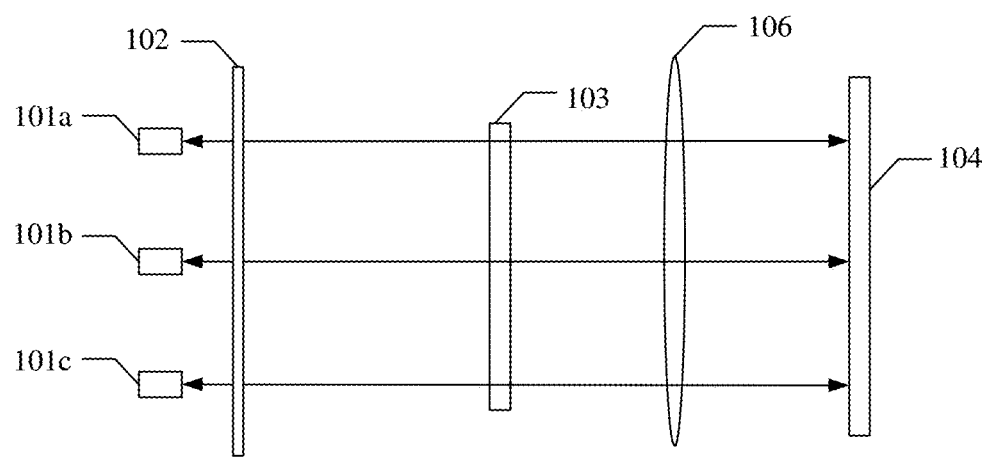
FIG. 4 is a side view of a structure of a second spectrum processing apparatus according to an embodiment of this application.
Figure 5:
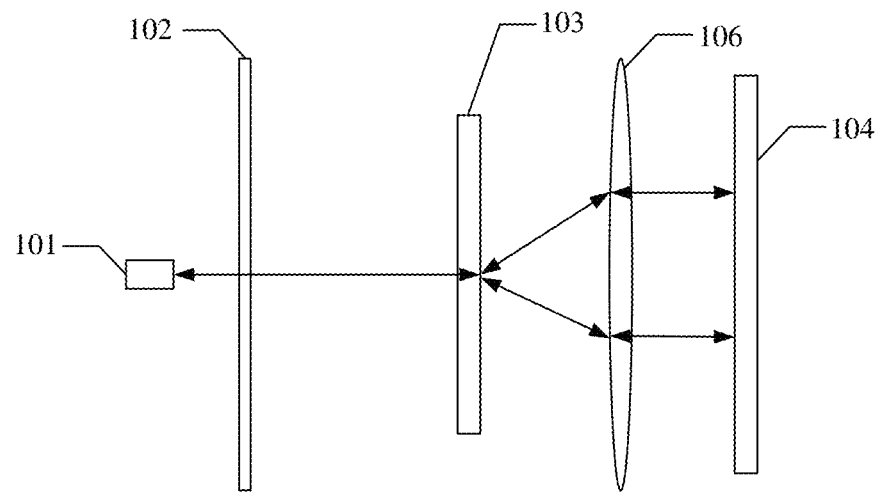
FIG. 5 is a top view of the structure of the second spectrum processing apparatus according to the embodiment of this application.

Referring to FIG. 4 and FIG. 5, FIG. 4 is a side view of a structure of a second spectrum processing apparatus according to an embodiment of this application, and FIG. 5 is a top view of the structure of the second spectrum processing apparatus according to the embodiment of this application. The spectrum processing apparatus includes: a port assembly 101, a lens assembly 102, a dispersive assembly 103, a spatial light modulator 104, and a first lens 106. Descriptions of the port assembly 101, the lens assembly 102, the dispersive assembly 103, and the spatial light modulator 104 are similar to the related descriptions of the embodiment shown in FIG. 1. Details are not described herein again.

Each port in the port assembly 101 is configured to transmit an input first light beam to a lens corresponding to the port. Each lens in the lens assembly 102 is configured to adjust a width of the first light beam to obtain a second light beam, and transmit the second light beam to the dispersive assembly 103. The dispersive assembly 103 is configured to decompose the second light beam into a plurality of sub-wavelength light beams in a first plane (FIG. 5 shows light beams in the first plane), and transmit the plurality of sub-wavelength light beams to the first lens 106. The first lens 106 is configured to refract the plurality of sub-wavelength light beams to the spatial light modulator 104 in the first plane, and transmit the plurality of sub-wavelength light beams in a second plane (FIG. 4 shows light beams in the second plane) to the spatial light modulator 104, where the first plane is perpendicular to the second plane. The spatial light modulator 104 is configured to modulate the plurality of sub-wavelength light beams, and reflect at least one modulated sub-wavelength light beam to the first lens 106. The first lens 106 is further configured to refract the at least one sub-wavelength light beam to the dispersive assembly 103 in the first plane, and transmit the at least one sub-wavelength light beam to the dispersive assembly 103 in the second plane. The dispersive assembly 103 is further configured to multiplex the at least one sub-wavelength light beam, and transmit a multiplexed light beam through the lens assembly 102 to the port assembly 101.

Figure 6:
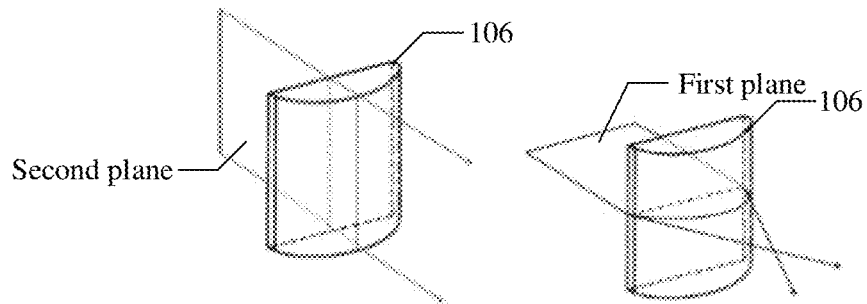
FIG. 6 is a schematic diagram of a structure of a first lens.

It should be noted that FIG. 6 is a schematic diagram of a structure of the first lens. The first lens 106 is a cylindrical lens. As can be seen from FIG. 6, when passing through the first lens 106, a sub-wavelength light beam is refracted only in the first plane, and is not refracted in the second plane. Therefore, when seen from the perspective of the first plane, the first lens 106 can transmit the sub-wavelength light beams to the spatial light modulator 104 by means of refraction, and when seen from the perspective of the second plane, the sub-wavelength light beams are not projected together onto a same position of the spatial light modulator 104 due to the refraction. This avoids a disorder caused by projection of the sub-wavelength light beams onto the same position of the spatial light modulator 104, while ensuring that the sub-wavelength light beams can be transmitted to the spatial light modulator 104. For example, as can be seen from FIG. 4, light beams emitted from a first port iota, a second port 101b, and a third port low are finally projected onto different positions of the spatial light modulator 104, so that a light beam reflected by the spatial light modulator 104 can be transmitted to a corresponding port.

Figure 7:
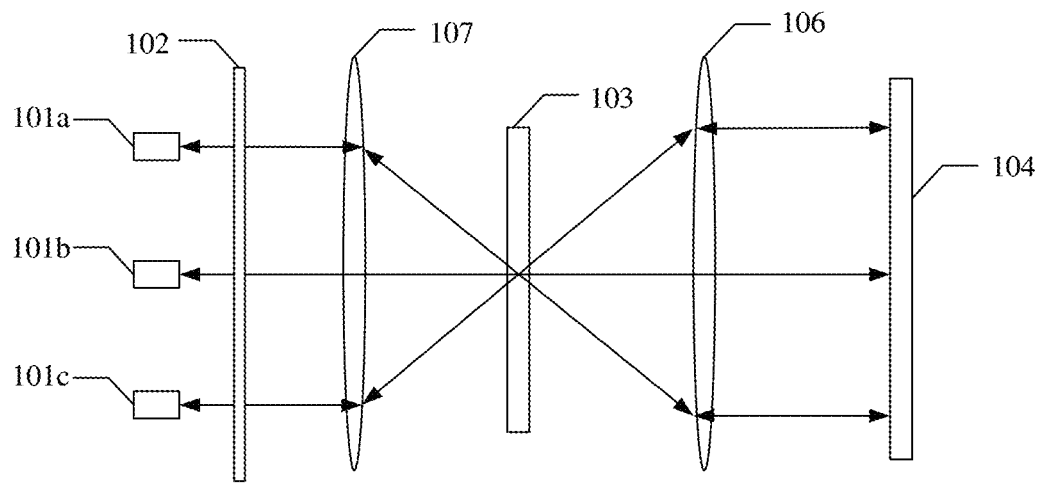
FIG. 7 is a side view of a structure of a third spectrum processing apparatus according to an embodiment of this application.
Figure 8:
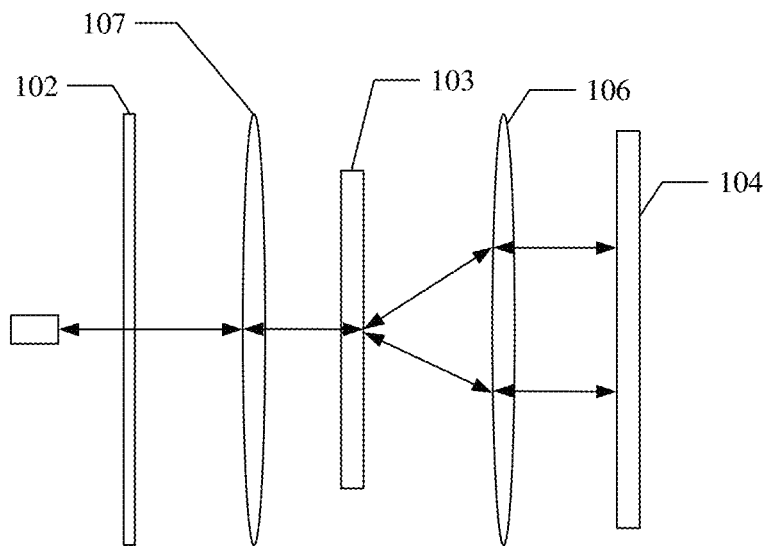
FIG. 8 is a top view of the structure of the third spectrum processing apparatus according to the embodiment of this application.

Referring to FIG. 7 and FIG. 8, FIG. 7 is a side view of a structure of a third spectrum processing apparatus according to an embodiment of this application, and FIG. 8 is a top view of the structure of the third spectrum processing apparatus according to the embodiment of this application. The spectrum processing apparatus includes: a port assembly 101, a lens assembly 102, a dispersive assembly 103, a spatial light modulator 104, a first lens 106, and a second lens 107. Descriptions of the port assembly 101, the lens assembly 102, the dispersive assembly 103, and the spatial light modulator 104 are similar to the related descriptions of the embodiment shown in FIG. 1. Details are not described herein again.

Each port in the port assembly 101 is configured to transmit an input first light beam to a lens corresponding to the port. Each lens in the lens assembly 102 is configured to adjust a width of the first light beam to obtain a second light beam, and transmit the second light beam to the second lens 107. The second lens 107 is configured to refract the second light beam to the dispersive assembly 103 in a second plane (FIG. 7 shows light beams in the second plane). The dispersive assembly 103 is configured to decompose the second light beam into a plurality of sub-wavelength light beams in a first plane (FIG. 8 shows light beams in the first plane), and transmit the plurality of sub-wavelength light beams to the first lens 106, where the first plane is perpendicular to the second plane. The first lens 106 is configured to refract the plurality of sub-wavelength light beams to the spatial light modulator 104 in the first plane and the second plane. The spatial light modulator 104 is configured to modulate the plurality of sub-wavelength light beams, and reflect at least one modulated sub-wavelength light beam to the first lens 106. The first lens 106 is further configured to refract the at least one sub-wavelength light beam to the dispersive assembly 103 in the first plane and the second plane. The dispersive assembly 103 is further configured to multiplex the at least one sub-wavelength light beam, and transmit a multiplexed light beam successively through the second lens 107 and the lens assembly 102 to the port assembly 101.

Optionally, the first lens 106 and the second lens 107 may use a standard 4f optical lens configuration. Specifically, the second lens 107 is located between the dispersive assembly 103 and the lens assembly 102, the first lens 106 is located between the dispersive assembly 103 and spatial light modulator 104, a distance between the first lens 106 and the dispersive assembly 103 is equal to a focal length of the first lens 106, a distance between the second lens 107 and the dispersive assembly 103 is equal to a focal length of the second lens 107, and a distance between the first lens 106 and spatial light modulator 104 is equal to the focal length of the first lens 106.

It should be noted that the first lens 106 in this embodiment is different from the first lens 106 in the embodiment shown in FIG. 4 and FIG. 5. In this embodiment, the first lens 106 may be a common convex lens, which refracts the second light beam in both the first plane and the second plane.

Figure 9:
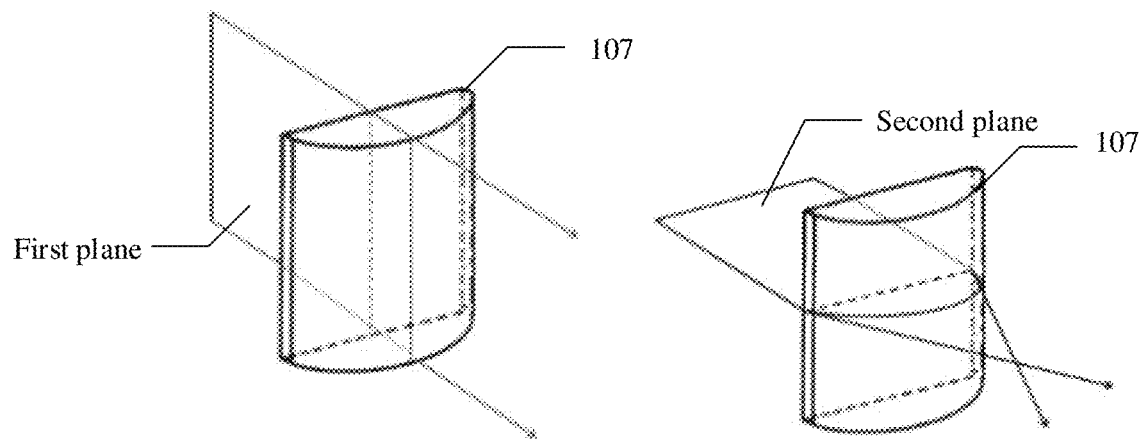
FIG. 9 is a schematic diagram of a structure of a second lens.

In addition, the second lens 107 is a cylindrical lens, and FIG. 9 is a schematic diagram of a structure of the second lens. Different from the cylindrical lens shown in FIG. 6, when passing through the second lens 107, the first light beam is refracted only in the second plane, and is not refracted in the first plane.

The three possible structures of the spectrum processing apparatus have been described above, and in all the foregoing three structures, a circulator may be used for each port to separate an input signal and an output signal. Optionally, each port in the port assembly 101 may also be classified as an input port and an output port. There may also be some changes in a structure of the spectrum processing apparatus in which the input port is distinguished from the output port. The following provides a description by using an example.

Figure 10:
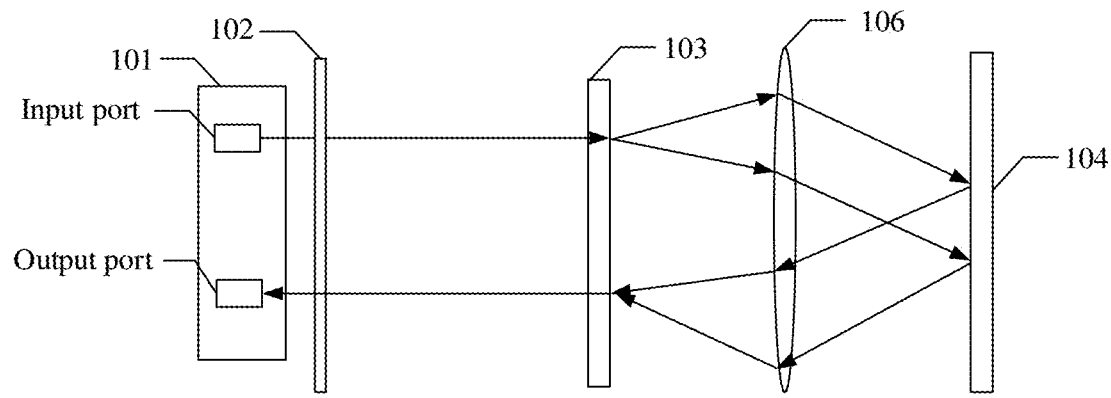
FIG. 10 is a top view of a structure of a fourth spectrum processing apparatus according to an embodiment of this application.

The second spectrum processing apparatus provided in FIG. 5 is used as an example. FIG. 10 is a top view of a structure of a fourth spectrum processing apparatus according to an embodiment of this application. Specifically, an input port and an output port are placed side by side in a first plane. In an input direction, each input port is configured to transmit an input first light beam to a lens corresponding to the input port. In an output direction, a light beam multiplexed by a dispersive assembly 103 is transmitted through a lens assembly 102 to an output port corresponding to the input port. As can be seen from FIG. 10, each port is classified as an input port and an output port, but the structure of the lens assembly 102, the dispersive assembly 103, a spatial light modulator 104, and a first lens 106 remains the same as the structure of the embodiment shown in FIG. 5, except that the SLM adjusts a reflection direction of each sub-wavelength light beam such that a light beam multiplexed by the dispersive assembly 103 can be transmitted to the output port corresponding to the input port. For the several other spectrum processing apparatuses provided in the foregoing embodiments, an input port and an output port may also be distinguished in the manner shown in FIG. 10. Details are not described herein again.

It should be noted that the spectrum processing apparatus may further have a plurality of other structures different from the foregoing example, and structure variations based on the foregoing idea all fall within the protection scope of this application. The following further provides a possible structure of the spectrum processing apparatus.

Figure 11:
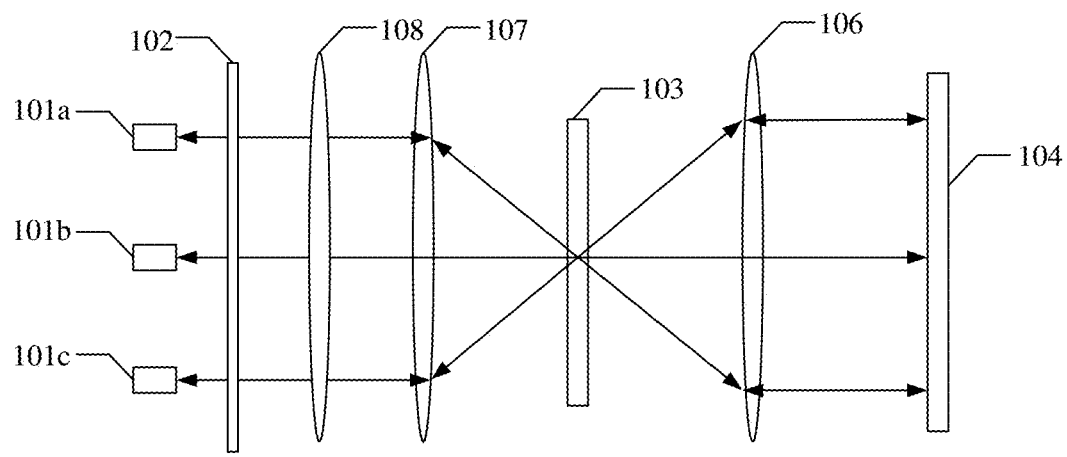
FIG. 11 is a side view of a structure of a fifth spectrum processing apparatus according to an embodiment of this application.
Figure 12:
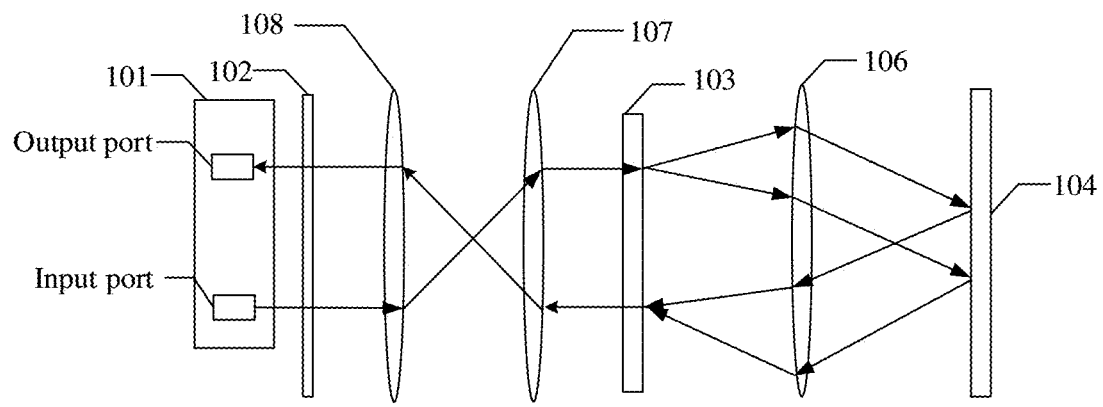
FIG. 12 is a top view of the structure of the fifth spectrum processing apparatus according to the embodiment of this application.

Referring to FIG. 11 and FIG. 12, FIG. 11 is a side view of a structure of a fifth spectrum processing apparatus according to an embodiment of this application, and FIG. 12 is a top view of the structure of the fifth spectrum processing apparatus according to the embodiment of this application.

The spectrum processing apparatus includes: a port assembly 101, a lens assembly 102, a dispersive assembly 103, a spatial light modulator 104, a first lens 106, a second lens 107, and a third lens 108. Descriptions of the port assembly 101, the lens assembly 102, the dispersive assembly 103, and the spatial light modulator 104 are similar to the related descriptions of the embodiment shown in FIG. 1. Details are not described herein again.

Each input port in the port assembly 101 is configured to transmit an input first light beam to a lens corresponding to the port. Each lens in the lens assembly 102 is configured to adjust a width of the first light beam to obtain a second light beam, and transmit the second light beam to the third lens 108. The third lens 108 is configured to refract the second light beam to the second lens 107 in a first plane (FIG. 11 shows light beams in the first plane). The second lens 107 is configured to refract the second light beam to the dispersive assembly 103 in a second plane (FIG. 10 shows light beams in the second plane), where the first plane is perpendicular to the second plane. The dispersive assembly 103 is configured to decompose the second light beam into a plurality of sub-wavelength light beams in the first plane, and transmit the plurality of sub-wavelength light beams to the first lens 106. The first lens 106 is configured to refract the plurality of sub-wavelength light beams to the spatial light modulator 104 in the first plane and the second plane. The spatial light modulator 104 is configured to modulate the plurality of sub-wavelength light beams, and reflect at least one modulated sub-wavelength light beam to the first lens 106. The first lens 106 is further configured to refract the at least one sub-wavelength light beam to the dispersive assembly 103 in the first plane and the second plane. The dispersive assembly 103 is further configured to multiplex the at least one sub-wavelength light beam, and transmit a multiplexed light beam successively through the second lens 107, a third lens 108, and the lens assembly 102 to an output port corresponding to the input port.

It should be noted that the first lens 106 in this embodiment is similar to the first lens 106 in the embodiment shown in FIG. 7 and FIG. 8. Details are not described herein again. The second lens 107 in this embodiment is different from the second lens 107 in the embodiment shown in FIG. 7 and FIG. 8. In this embodiment, the second lens 107 may be a common convex lens, which refracts the second light beam in both the first plane and the second plane.

In addition, the third lens 108 is a cylindrical lens, and a structure of the third lens 108 is similar to that of the cylindrical lens shown in FIG. 6. Details are not described herein again.

Optionally, on the basis of the various spectrum processing apparatuses listed above, the spectrum processing apparatus may further be provided with a polarization assembly 109. The polarization assembly 109 is adjacent to the lens assembly 102, and when seen from an input direction of a light beam, the polarization assembly 109 is located behind the lens assembly 102. Specifically, in the input direction of the light beam, the polarization assembly 109 is configured to separate polarizations of the second light beam to obtain a first polarized light beam (o light) and a second polarized light beam (e light), and further transmit the first polarized light beam and the second polarized light beam along the input direction, where the first polarized light beam and the second polarized light beam have mutually orthogonal polarization components. Correspondingly, in an output direction of the light beam, the polarization assembly 109 is configured to restore the first polarized light beam and the second polarized light beam into a state before the separation, and further transmit a restored light beam along the output direction.

Figure 13:
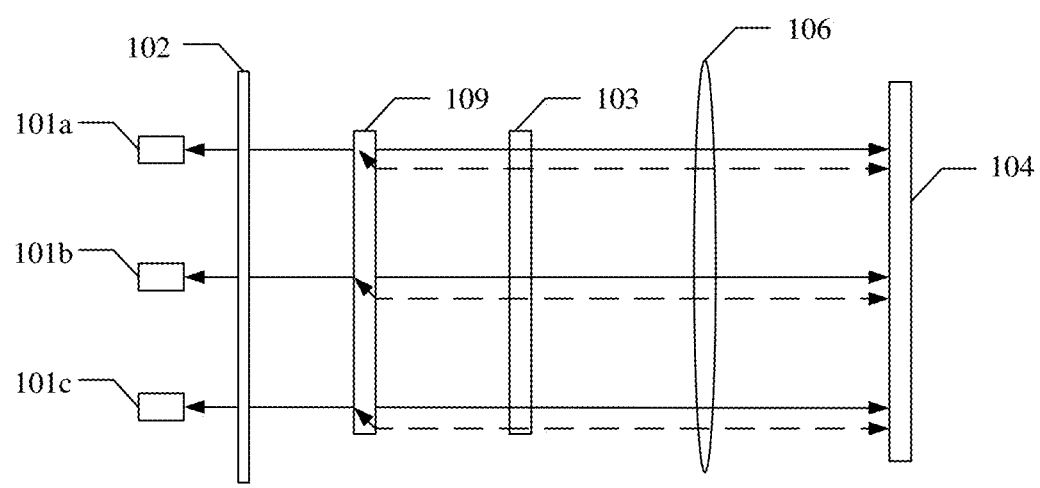
FIG. 13 is a side view of a structure of a sixth spectrum processing apparatus according to an embodiment of this application.

The following describes the spectrum processing apparatus including the polarization assembly 109 by using the structure of the second spectrum processing apparatus shown in FIG. 4 as an example. FIG. 13 is a side view of a structure of a sixth spectrum processing apparatus according to an embodiment of this application. The spectrum processing apparatus includes: a port assembly 101, a lens assembly 102, a dispersive assembly 103, a spatial light modulator 104, a first lens 106, and a polarization assembly 109. Descriptions of the port assembly 101, the lens assembly 102, the dispersive assembly 103, and the spatial light modulator 104 are similar to the related descriptions of the embodiment shown in FIG. 1. Details are not described herein again. Specifically, the polarization assembly 109 decomposes a second light beam into a first polarized light beam (as shown by the solid line in FIG. 13) and a second polarized light beam (as shown by the dashed line in FIG. 13) in a second plane (FIG. 13 shows light beams in the second plane). In addition, for the structures of the several other spectrum processing apparatuses listed above, the polarization assembly 109 may also be arranged with reference to the manner shown in FIG. 13. Details are not described herein again.

It should be noted that, applicable functions of the spectrum processing apparatus not only have different requirements for sizes of light spots formed on the SLM, but also have different requirements for insertion loss (IL) of each port. The spectrum processing apparatus shown in FIG. 4 is used as an example. In optical design, a shorter distance between a port and an optic axis of the first lens 106 indicates smaller insertion loss of the port. Therefore, in design of distribution of ports, the ports may be symmetrically distributed with respect to the optic axis of the first lens 106, so as to differentiate insertion loss of the ports during use, and select corresponding ports to implement different functions. It may be understood that, corresponding to the different structures of the foregoing spectrum processing apparatuses, symmetrical distribution of the ports may also be different. Specifically, in the spectrum processing apparatus shown in FIG. 1, the ports may be symmetrically distributed with respect to an optic axis of the reflective element 105 in a plane perpendicular to the plane shown in FIG. 1. In the spectrum processing apparatus shown in FIG. 7, the ports may be symmetrically distributed with respect to an optic axis of the first lens 106 or the second lens 107. In the spectrum processing apparatus shown in FIG. 11, the ports may be symmetrically distributed with respect to an optic axis of the first lens 106, the second lens 107, or the third lens 108.

For example, the port assembly 101 has a total of five ports that are distributed in sequence, namely, ports 1 to 5. It is assumed that three different functions in total need to be allocated to the five ports, where one port is for wavelength blocking, two ports are for dynamic spectrum adjustment, and the other two ports are for spectrum scanning. According to insertion loss requirement analysis, because the port 3 is located in the middle position and has the smallest insertion loss for being closest to the optic axis, the port 1 is for wavelength blocking. In addition, because of the wavelength blocking to be implemented, a light spot of a light beam projected from the port 1 onto the spatial light modulator 104 should be relatively small. The port 1 and the port 5 are located at edge positions and have the largest insertion loss. Therefore, the port 1 and the port 5 are for spectrum scanning that is not sensitive to insertion loss. In addition, to improve accuracy of the spectrum scanning of the spectrum processing apparatus, light spots of light beams projected from the port 1 and the port 5 onto the spatial light modulator 104 should be relatively small. The port 2 and the port 4 are located between the middle port and the edge ports and have relatively moderate insertion loss. Therefore, the port 2 and the port 4 are for dynamic spectrum adjustment. In addition, dynamic spectrum adjustment requires that a spectrum curve be relatively smooth after adjustment, and light spots of light beams projected from the port 2 and the port 4 onto the spatial light modulator 104 should be relatively large.

It may be understood that, functions allocated to the ports in the port assembly 101 are subject to practical applications. This is not specifically limited herein.

Figure 14:
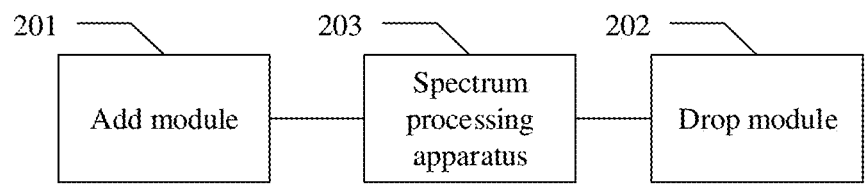
FIG. 14 is a schematic diagram of a structure of a ROADM according to an embodiment of this application.

FIG. 14 is a schematic diagram of a structure of a reconfigurable optical add-drop multiplexer (ROADM) according to an embodiment of this application. The ROADM includes an add module 201, a drop module 202, and a spectrum processing apparatus 203. The spectrum processing apparatus 203 may be any one of the structures shown in FIG. 1, FIG. 4, FIG. 5, FIG. 7, FIG. 8, FIG. 10, FIG. 11, FIG. 12, and FIG. 13. The spectrum processing apparatus 203 is configured to implement spectrum processing functions such as dynamic spectrum adjustment, spectrum scanning, and wavelength blocking. The add module 201 may include a plurality of transmitters, and is configured to add a local optical wavelength signal from the port assembly of the spectrum processing apparatus 203. The drop module 202 may include a plurality of receivers, and is configured to drop a local optical wavelength signal from the port assembly of the spectrum processing apparatus 203.

Figure 15:
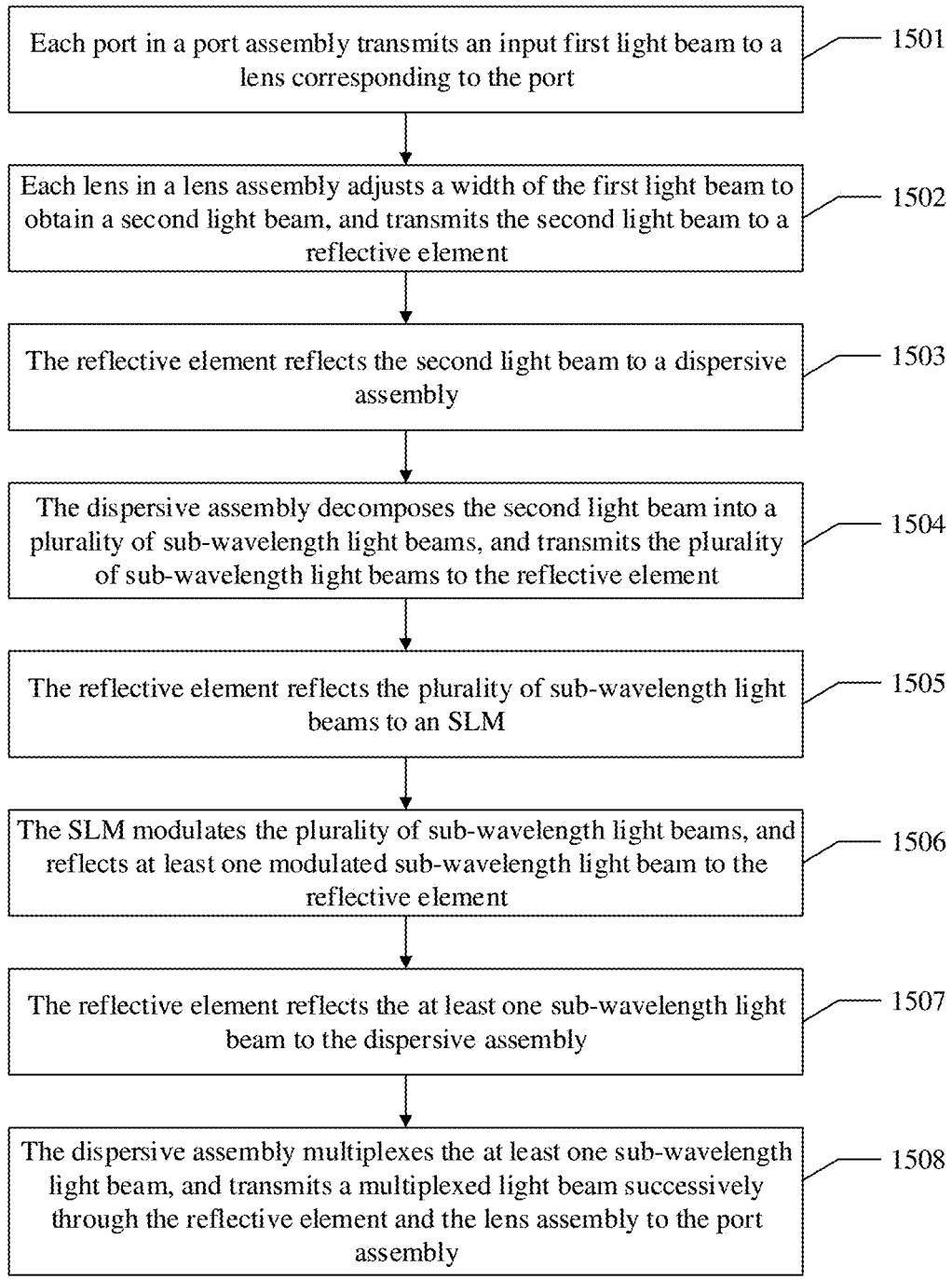
FIG. 15 is a schematic diagram of an embodiment of a signal transmission method using a spectrum processing apparatus according to an embodiment of this application.

Referring to FIG. 15 below, an embodiment shown in FIG. 15 provides a signal transmission method using a spectrum processing apparatus.

Specifically, the spectrum processing apparatus in this embodiment of this application is the structure of the spectrum processing apparatus in the embodiment shown in FIG. 1. Details are not described herein again.

The method includes the following steps.

1501: Each port in a port assembly transmits an input first light beam to a lens corresponding to the port.

1502: Each lens in a lens assembly adjusts a width of the first light beam to obtain a second light beam, and transmits the second light beam to a reflective element.

1503: The reflective element reflects the second light beam to a dispersive assembly.

1504: The dispersive assembly decomposes the second light beam into a plurality of sub-wavelength light beams, and transmits the plurality of sub-wavelength light beams to the reflective element.

1505: The reflective element reflects the plurality of sub-wavelength light beams to an SLM.

1506: The SLM modulates the plurality of sub-wavelength light beams, and reflects at least one modulated sub-wavelength light beam to the reflective element.

1507: The reflective element reflects the at least one sub-wavelength light beam to the dispersive assembly.

1508: The dispersive assembly multiplexes the at least one sub-wavelength light beam, and transmits a multiplexed light beam successively through the reflective element and the lens assembly to the port assembly.

In this embodiment of this application, due to different sizes of light spots on the SLM, corresponding light beams are applicable to different functions. For example, a light beam corresponding to a small light spot is applicable to a wavelength blocking function, while a light beam corresponding to a large light spot is applicable to overall spectrum adjustment. In the spectrum processing apparatus provided in this application, the port assembly includes at least two ports, and each lens in the lens assembly can adjust a width of a light beam from a port. To be specific, a width of a light beam after passing through a lens may become larger or smaller, or may remain unchanged, and sizes of light spots formed by light beams of different widths on the SLM are also different. Therefore, the plurality of ports of the spectrum processing apparatus may be used to implement different functions, thereby enriching functions of the spectrum processing apparatus.

Figure 16:
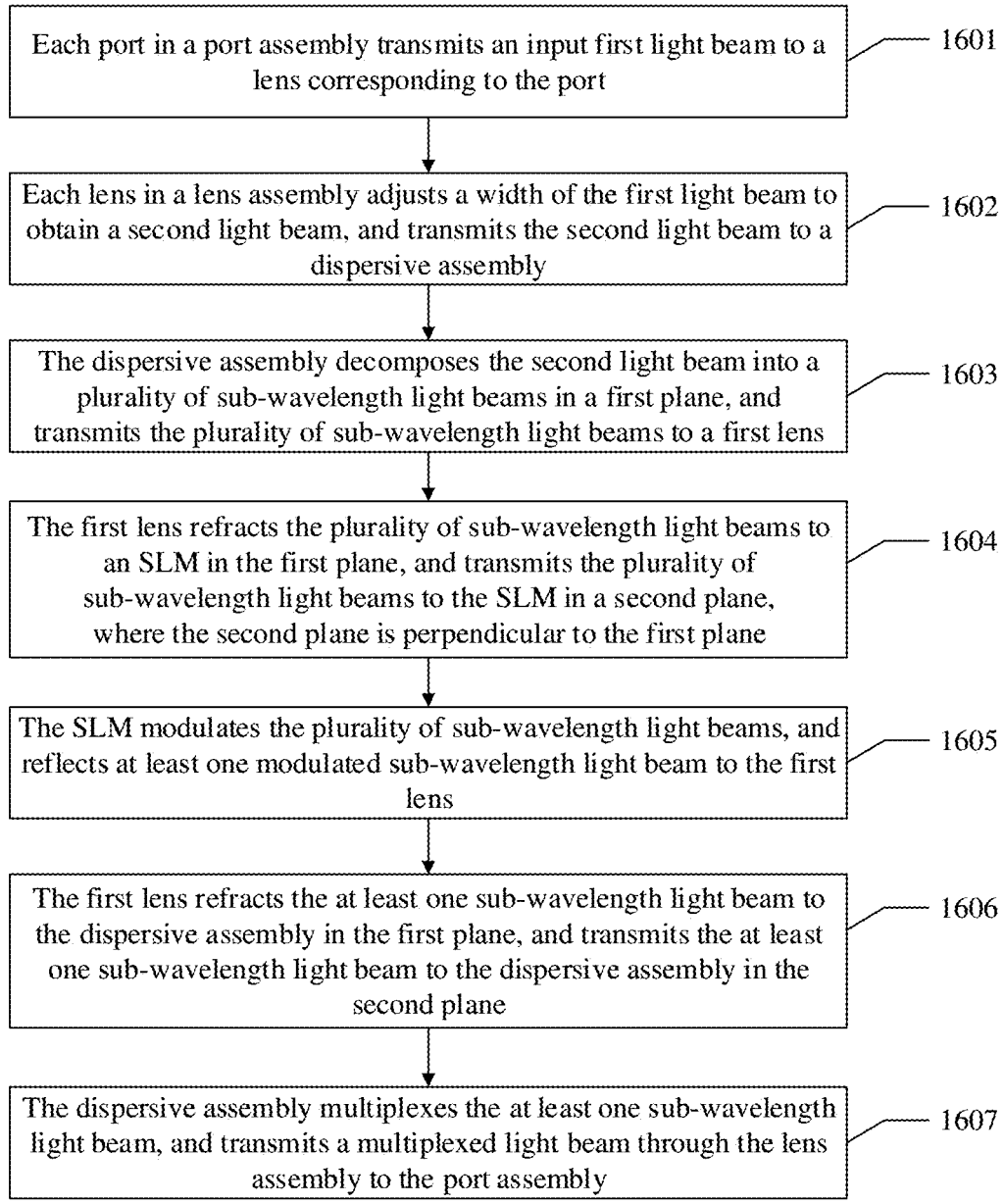
FIG. 16 is a schematic diagram of an embodiment of another signal transmission method using a spectrum processing apparatus according to an embodiment of this application.

Referring to FIG. 16 below, an embodiment shown in FIG. 16 provides another signal transmission method using a spectrum processing apparatus.

Specifically, the spectrum processing apparatus in this embodiment of this application is the structure of the spectrum processing apparatus in the embodiment shown in FIG. 4 and FIG. 5. Details are not described herein again.

The method includes the following steps.

1601: Each port in a port assembly transmits an input first light beam to a lens corresponding to the port.

1602: Each lens in a lens assembly adjusts a width of the first light beam to obtain a second light beam, and transmits the second light beam to a dispersive assembly.

1603: The dispersive assembly decomposes the second light beam into a plurality of sub-wavelength light beams in a first plane, and transmits the plurality of sub-wavelength light beams to a first lens.

1604: The first lens refracts the plurality of sub-wavelength light beams to an SLM in the first plane, and transmits the plurality of sub-wavelength light beams to the SLM in a second plane, where the second plane is perpendicular to the first plane.

1605: The SLM modulates the plurality of sub-wavelength light beams, and reflects at least one modulated sub-wavelength light beam to the first lens.

1606: The first lens refracts the at least one sub-wavelength light beam to the dispersive assembly in the first plane, and transmits the at least one sub-wavelength light beam to the dispersive assembly in the second plane.

1607: The dispersive assembly multiplexes the at least one sub-wavelength light beam, and transmits a multiplexed light beam through the lens assembly to the port assembly.

Figure 17:
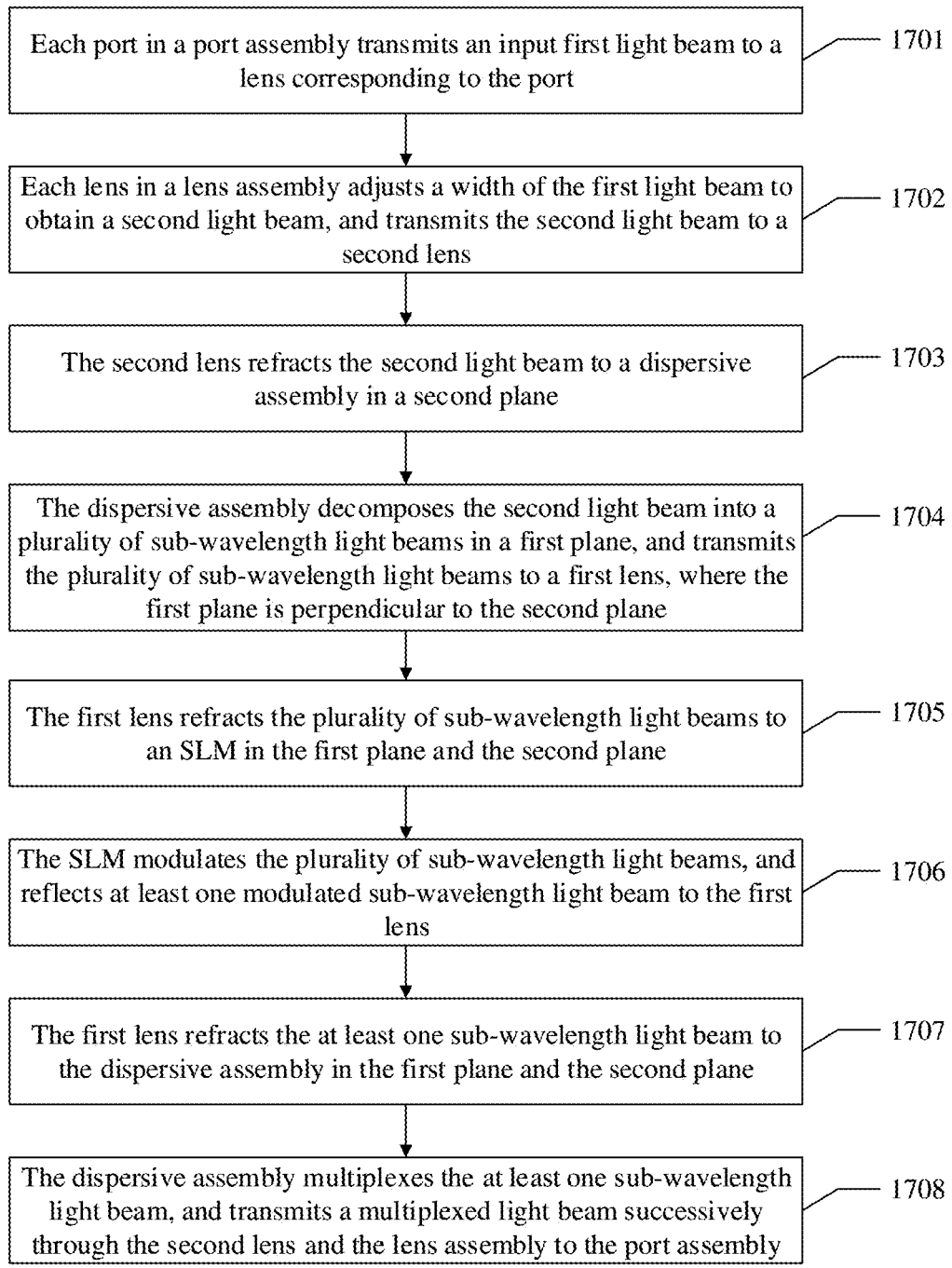
FIG. 17 is a schematic diagram of an embodiment of another signal transmission method using a spectrum processing apparatus according to an embodiment of this application.

Referring to FIG. 17 below, an embodiment shown in FIG. 17 provides another signal transmission method using a spectrum processing apparatus.

Specifically, the spectrum processing apparatus in this embodiment of this application is the structure of the spectrum processing apparatus in the embodiment shown in FIG. 7 and FIG. 8. Details are not described herein again.

The method includes the following steps.

1701: Each port in a port assembly transmits an input first light beam to a lens corresponding to the port.

1702: Each lens in a lens assembly adjusts a width of the first light beam to obtain a second light beam, and transmits the second light beam to a second lens.

1703: The second lens refracts the second light beam to a dispersive assembly in a second plane.

1704: The dispersive assembly decomposes the second light beam into a plurality of sub-wavelength light beams in a first plane, and transmits the plurality of sub-wavelength light beams to a first lens, where the first plane is perpendicular to the second plane.

1705: The first lens refracts the plurality of sub-wavelength light beams to an SLM in the first plane and the second plane.

1706: The SLM modulates the plurality of sub-wavelength light beams, and reflects at least one modulated sub-wavelength light beam to the first lens.

1707: The first lens refracts the at least one sub-wavelength light beam to the dispersive assembly in the first plane and the second plane.

1708: The dispersive assembly multiplexes the at least one sub-wavelength light beam, and transmits a multiplexed light beam successively through the second lens and the lens assembly to the port assembly.

It should be noted that the foregoing embodiments are merely used to describe the technical solutions of this application, but are not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An apparatus comprising: a port assembly, a lens assembly, a dispersive assembly, a spatial light modulator (SLM), and a reflective element, wherein the port assembly comprises N ports, and the lens assembly comprises M lenses, wherein the M lenses are zoom lenses, wherein N is an integer greater than 1, and M is an integer greater than or equal to 1 and less than or equal to N; and
wherein:
each port in the port assembly is configured to transmit an input first light beam to a lens in the lens assembly corresponding to the respective port in the port assembly;
each lens in the lens assembly is configured to adjust a width of the first light beam to obtain a second light beam, and transmit the second light beam to the reflective element;
the reflective element is configured to reflect each second light beam to the dispersive assembly;
the dispersive assembly is configured to decompose each second light beam into a plurality of sub-wavelength light beams, and transmit each plurality of sub-wavelength light beams to the reflective element;
the reflective element is further configured to reflect each plurality of sub-wavelength light beams to the SLM;
the SLM is configured to modulate each plurality of sub-wavelength light beams, and reflect at least one modulated sub-wavelength light beam to the reflective element;
the reflective element is further configured to reflect the at least one modulated sub-wavelength light beam to the dispersive assembly; and
the dispersive assembly is further configured to multiplex the at least one modulated sub-wavelength light beam, and transmit a multiplexed light beam to the port assembly through the reflective element and the lens assembly.

2. The apparatus according to claim 1, wherein the zoom lenses comprise variable-focus liquid lenses.

3. The apparatus according to claim 1, wherein each port comprises an input port and an output port;
each port in the port assembly being configured to transmit the input first light beam to the lens corresponding to the respective port comprises:
each input port is configured to transmit the input first light beam to the lens corresponding to the input port of the respective port; and
the dispersive assembly being further configured to multiplex the at least one modulated sub-wavelength light beam, and transmit the multiplexed light beam to the port assembly through the reflective element and the lens assembly comprises:
the dispersive assembly is further configured to multiplex the at least one modulated sub-wavelength light beam, and transmit the multiplexed light beam, through the reflective element and the lens assembly, to the output port corresponding to the input port of the respective port.

4. The apparatus according to claim 1, further comprising: a polarization assembly located between the lens assembly and the reflective element; and
the polarization assembly is configured to separate polarizations of the second light beam into a first polarized light beam and a second polarized light beam, and transmit the first polarized light beam and the second polarized light beam to the dispersive assembly, wherein the first polarized light beam and the second polarized light beam have mutually orthogonal polarization components.

5. The apparatus according to claim 1, wherein the N ports are symmetrically distributed with respect to an optic axis of the reflective element.

6. The apparatus according to claim 1, wherein the SLM comprises a microelectromechanical system (MEMS) micromirror array.

7. The apparatus according to claim 1, wherein the lens assembly comprises a concave lens and a convex lens.

8. The apparatus according to claim 1, wherein the dispersive assembly is a grating.

9. The apparatus according to claim 1, wherein the SLM comprises a liquid crystal modulator.

10. The apparatus according to claim 1, wherein the SLM comprises a liquid crystal on silicon (LCoS) array.

11. The apparatus according to claim 1, wherein the dispersive assembly is a prism.

12. A reconfigurable optical add-drop multiplexer (ROADM), comprising a transmitter, a receiver, and an apparatus, wherein
the transmitter is configured to add a first local optical wavelength signal to a port assembly of the apparatus;
the receiver is configured to drop a second local optical wavelength signal from the port assembly of the apparatus; and
the apparatus comprises:
the port assembly, a lens assembly, a dispersive assembly, a spatial light modulator (SLM), and a reflective element, wherein the port assembly comprises N ports, and the lens assembly comprises M lenses, wherein the M lenses are zoom lenses, wherein N is an integer greater than 1, and M is an integer greater than or equal to 1 and less than or equal to N; and wherein:
each port in the port assembly is configured to transmit an input first light beam to a lens in the lens assembly corresponding to the respective port in the port assembly;
each lens in the lens assembly is configured to adjust a width of the first light beam to obtain a second light beam, and transmit the second light beam to the reflective element;
the reflective element is configured to reflect each second light beam to the dispersive assembly;
the dispersive assembly is configured to decompose each second light beam into a plurality of sub-wavelength light beams, and transmit each plurality of sub-wavelength light beams to the reflective element;
the reflective element is further configured to reflect each plurality of sub-wavelength light beams to the SLM;
the SLM is configured to modulate each plurality of sub-wavelength light beams, and reflect at least one modulated sub-wavelength light beam to the reflective element;
the reflective element is further configured to reflect the at least one modulated sub-wavelength light beam to the dispersive assembly; and
the dispersive assembly is further configured to multiplex the at least one modulated sub-wavelength light beam, and transmit a multiplexed light beam to the port assembly through the reflective element and the lens assembly.

13. The ROADM according to claim 12, wherein each port comprises an input port and an output port;
each port in the port assembly being configured to transmit the input first light beam to the lens corresponding to the respective port comprises:
each input port is configured to transmit the input first light beam to the lens corresponding to the input port of the respective port; and
the dispersive assembly being further configured to multiplex the at least one modulated sub-wavelength light beam, and transmit the multiplexed light beam to the port assembly through the reflective element and the lens assembly comprises:
the dispersive assembly is further configured to multiplex the at least one modulated sub-wavelength light beam, and transmit the multiplexed light beam, through the reflective element and the lens assembly, to the output port corresponding to the input port of the respective port.

14. The ROADM according to claim 12, wherein the apparatus further comprises: a polarization assembly located between the lens assembly and the reflective element; and
wherein the polarization assembly is configured to separate polarizations of the second light beam into a first polarized light beam and a second polarized light beam, and transmit the first polarized light beam and the second polarized light beam to the dispersive assembly, wherein the first polarized light beam and the second polarized light beam have mutually orthogonal polarization components.

15. The ROADM according to claim 12, wherein the N ports are symmetrically distributed with respect to an optic axis of the reflective element.

16. The ROADM according to claim 12, wherein the lens assembly comprises a concave lens and a convex lens.

17. The ROADM according to claim 12, wherein the zoom lenses comprise variable-focus liquid lenses.

18. A method, wherein the method comprises:
transmitting, using a first port of a port assembly of an apparatus, a third light beam to a first lens in a lens assembly of the apparatus corresponding to the first port, wherein the first lens comprises a zoom lens;
using the first lens, adjusting a width of the third light beam to obtain a fourth light beam, and transmitting the fourth light beam to a reflective element of the apparatus;
reflecting, using the reflective element, the fourth light beam to a dispersive assembly of the apparatus;
using the dispersive assembly, decomposing the fourth light beam into a first plurality of sub-wavelength light beams, and transmitting the first plurality of sub-wavelength light beams to the reflective element;
reflecting, using the reflective element, the first plurality of sub-wavelength light beams to a spatial light modulator (SLM) of the apparatus;
using the SLM, modulating the first plurality of sub-wavelength light beams, and reflecting at least one modulated sub-wavelength light beam to the reflective element;
reflecting, using the reflective element, the at least one modulated sub-wavelength light beam to the dispersive assembly; and
using the dispersive assembly, multiplexing the at least one modulated sub-wavelength light beam, and transmitting a multiplexed light beam to the port assembly through the reflective element and the lens assembly.

19. The method according to claim 18, wherein the first port comprises an input port and an output port, and transmitting, using the first port of the port assembly of the apparatus, the third light beam to the first lens in the lens assembly of the apparatus corresponding to the first port comprises:
transmitting the third light beam to the first lens, the first lens corresponding to the input port of the first port.

20. The method according to claim 19, wherein multiplexing the at least one modulated sub-wavelength light beam, and transmitting the multiplexed light beam to the port assembly through the reflective element and the lens assembly comprises:
multiplexing the at least one modulated sub-wavelength light beam, and transmitting a multiplexed light beam to the output port of the first port through the reflective element and the lens assembly.

* * * * *